Oct. 30, 1962  H. H. ADISE  3,060,731
MOTION TRANSLATOR
Filed Sept. 11, 1958  2 Sheets-Sheet 1
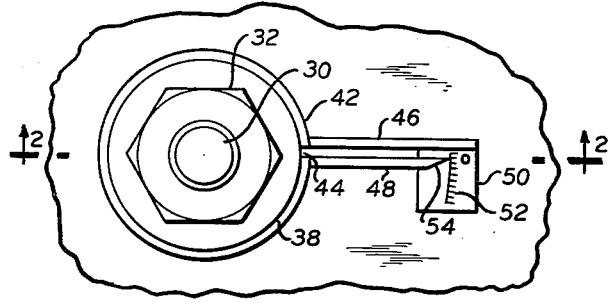
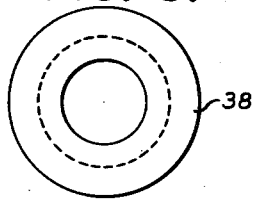
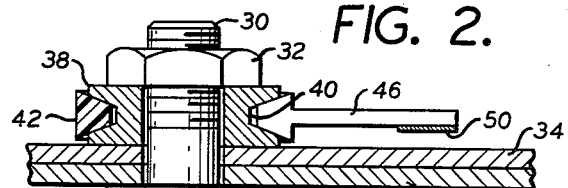
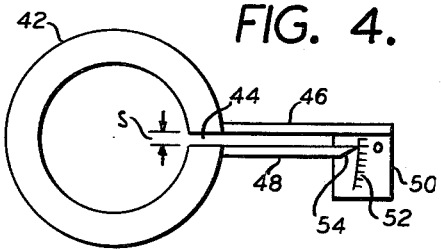
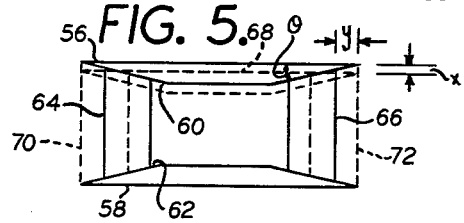
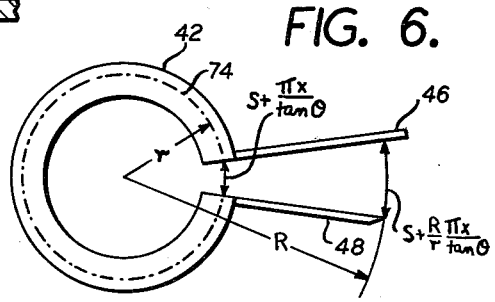
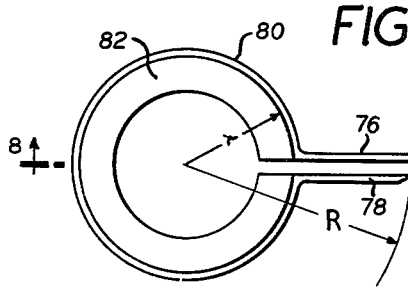
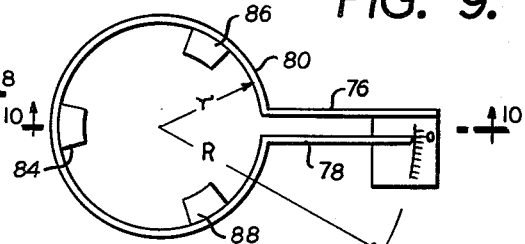
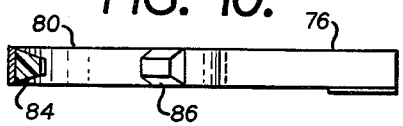
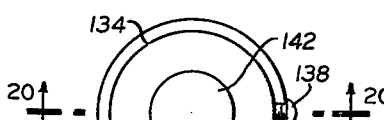
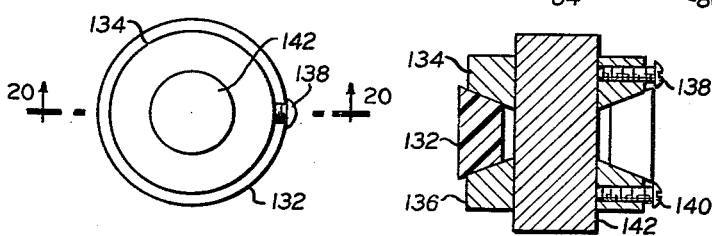
INVENTOR
HERBERT H. ADISE
BY
Byerly, Townsend, Watson & Churchill
ATTORNEYS.

Oct. 30, 1962 H. H. ADISE 3,060,731
MOTION TRANSLATOR
Filed Sept. 11, 1958 2 Sheets-Sheet 2

INVENTOR
HERBERT H. ADISE
BY
Byerly, Townsend, Watson & Churchill
ATTORNEYS.

United States Patent Office 3,060,731  
Patented Oct. 30, 1962

3,060,731  
MOTION TRANSLATOR  
Herbert H. Adise, 65 Dickenson Place, Great Neck, N.Y.  
Filed Sept. 11, 1958, Ser. No. 760,385  
17 Claims. (Cl. 73—141)

The present invention relates to a motion translator particularly suited for use in a first mode of operation as a component part of a strain gauge or load indicator, and in a second mode of operation as a component part of a micro-manipulator or the like.

In a strain gauge, for example, it is necessary to convert extremely small movements into an easily readable indication, whereas in a micro-manipulator, or the like, it is required to convert a movement within the capabilities of manual or motive manipulation into one which is microscopic in nature. In either case large mechanical motion amplification or reduction is involved.

It is an object of the present invention to provide the necessary mechanical motion amplification or reduction in a linear manner without the use of delicate or critical parts.

It is a further object of the present invention to provide a motion translator with the foregoing capabilities which is able to transmit large forces and withstand severe handling.

In furtherance of the foregoing objects there is provided in accordance with the present invention a motion translator comprising a split ring, a member coaxially disposed with respect to the ring for axial movement relative thereto, said member engaging the ring with engaging surfaces of the ring and member being shaped such that axial movement of the member and opening and closing of the gap due to the split in the ring are mutually dependent, and means for translating a physical quantity between said ring and a remote point, said last mentioned means being coupled with said ring for mutually dependent operation with relation to the opening and closing of said gap.

The invention will be better understood and additional objects will appear after reading the following detailed description of several exemplary embodiments thereof in conjunction with the appended drawings wherein:

FIGURE 1 is a plan view of an embodiment of the invention as applied to the measurement of the loading on a conventional nut and bolt assembly;

FIGURE 2 is a vertical sectional view taken on line 2—2 of FIGURE 1;

FIGURE 3 is a plan view of the apertured disc-like load sensing member with V-shaped peripheral groove employed in the embodiment of FIGURES 1 and 2;

FIGURE 4 is a plan view of the split ring and indicator card employed in the embodiment of FIGURES 1 and 2;

FIGURE 5 is a diagrammatic representation useful in explaining the operation of the embodiment shown in FIGURES 1 to 4;

FIGURE 6 is a plan view of the split ring similar to FIGURE 4, but showing the ring in expanded condition and useful in explaining the operation thereof;

FIGURE 7 is a plan view of a modified form of split ring of the type shown in FIGURE 4;

FIGURE 8 is a sectional view taken on line 8—8 of FIGURE 7;

FIGURE 9 is a plan view of a still further modification of the split ring of the invention;

FIGURE 10 is a sectional view taken on line 10—10 of FIGURE 9;

FIGURE 19 is a plan view showing a still further modification of the invention as applied to a strain gauge; and FIGURE 20 is a sectional view on line 20—20 of FIGURE 19.

Throughout the drawings the same reference numerals will be used to designate the same or equivalent parts.

Figure 11:
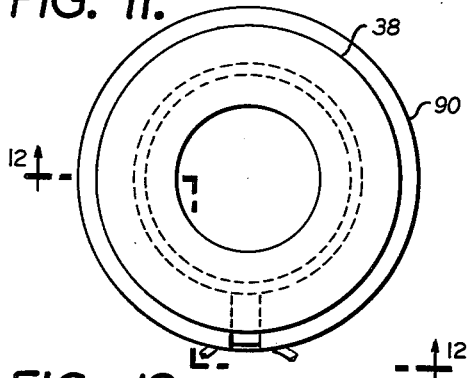
FIGURE 11 is a plan view of another modification of the invention wherein an electro-mechanical element surrounds the split ring to provide the required indications.

Referring now to FIGURES 1 to 4, the invention is illustrated as applied to a bolt load indicator. For purposes of explanation, it may be assumed that the bolt 30 and nut 32 are to be assembled with a given pre-load for securing together the plates 34 and 36, of which only fragmentary portions are shown.

It is well known that the proper pre-loading of a bolt is essential to its performance without failure under repeated stresses. Heretofore, it has been common practice to employ a torque wrench which indicates the torque developed during tightening of the nut on the bolt. The torque wrench method, however, assumes a relationship between tightening torque and bolt tension which is subject to numerous variable factors such as thread lubrication, finish, previous handling, and so forth. As a result, this method is not very accurate.

A more direct indication of bolt tension can be obtained by measurement of the load upon an auxiliary member subjected to the same bolt tension load. For example, a washer placed directly under the nut, between the nut and the parts being bolted together, or directly under the bolt head, will be subjected to the same load as the bolt. The compressive forces on the washer, equal and opposite to the tensile forces on the bolt, will cause the washer to deform. Within the elastic region of compression of the washer material, this deformation will be proportional to the load. The problem, however, is to measure this extremely small deformation with a comparatively high degree of accuracy. This is accomplished by the present invention.

Thus, a washer in the form of an apertured disc-like load sensing member 38 having a V-shaped or wedge-shaped peripheral groove 40 is placed on the bolt 30 under the nut 32 to be compressed between the nut and the plate 34. A split ring 42 having an effective wedge-shaped cross section complemental to the groove in the member 38 is mounted therein as seen in the drawing. In the embodiment shown in FIGURES 1 to 4, the split ring is of solid construction, and may be formed of a material such as nylon or polytetrafluoroethylene having low sliding friction characteristics as will be explained in further detail hereinafter. The split ring 42 is constructed such that a gap of length, $s$, is developed at the split 44, when the disc-like member 38 is in relaxed condition free from compressive forces. As seen in FIGURES 2 and 4, a pair of elongated arms 46 and 48 disposed in the plane of the ring 42 are joined to the ring one on each side of the gap 44 and extend generally radially therefrom.

An indicator card 50 is carried by the arm 46 at its free end. The card 50 may be provided on its upper surface as seen in FIGURE 1 with a uniformly graduated scale 52. Although not shown, it is contemplated that means may be provided for adjusting the zero point of the scale 52 relative to its supporting arm 46. The arm 48, as shown, is constructed somewhat shorter than arm 46 and tapered at its end 54 to provide a pointer for traversing or scanning the scale 52.

In general the operation of the bolt load indicator will be as follows. The parts are assembled as shown in FIGURE 2 and the nut made finger tight. The scale 52 on indicator card 50 is adjusted or marked in suitable manner to establish the initial or zero setting of the pointer arm 48. The nut is then tightened causing the washer member 38 to deform. The amount of deformation will be a function of the stress-strain characteristic of the washer material and configuration. As the washer is compressed the groove 40 will similarly deform and squeeze the split ring. If the wedge angles are chosen such that the friction can be overcome, the squeezing of the ring will cause it to expand radially. Since its length is fixed, this will result in enlargement of the gap 44. Additionaly, within the elastic limit of the material of the ring, the arms 46 and 48 will spread fan-like as illustrated in FIGURE 6.

For a better understanding of the operation of the motion translator portion of the load indicator, reference should now be had to the diagrammatic representation in FIGURE 5. For purpose of explanation, the opposite sides of the washer or disc-like member of FIGURE 2 may be considered equivalent to a pair of complementary wedge portions 56 and 58 (FIG. 5) having conically shaped operative surfaces 60 and 62, respectively. The diametrically opposite sections of the split ring are represented by the wedge-shaped elements 64 and 66. The wedge angle is represented by $\theta$. If it is assumed that the wedge 56 moves to the position 68 shown in dashed lines and approaches the wedge 58 by a distance $x$, then the elements 64 and 66 will each move radially outwardly a distance $y$ to the new positions 70 and 72, respectively, shown in dashed lines. That is, the radius of the split ring will increase by the amount, $y$. For this situation it can be shown that $$\tan \theta = \frac{x}{2y}$$

or $$y = \frac{x}{2 \tan \theta}$$

Now refer to FIGURE 6 wherein the split ring is shown Let it be assumed that the dot-dash line 74 represents the location of the neutral surface of the ring such that its circumferential length remains constant during flexure of the ring within its elastic limit. Therefore, if the radius, $r$, of the neutral surface has increased by the amount, $y$, then the gap 44 at the neutral surface will have increased circumferentially by an amount equal to $$\frac{\pi x}{\tan \theta}$$

Since the gap length was originally, $s$, the new gap will be $$s + \frac{\pi x}{\tan \theta}$$

at the neutral surface. If the initial gap $s$ as well as the subsequent opening of the ring is small, it can be assumed to a close approximation that the arms 46 and 48 extend radially at all times. This ignores the parallelism initially and any elastic deformation of the ends of the material as the ring is expanded. But making the foregoing assumption it should be apparent that the arcuate distance between the arms 46 and 48 at their extremities will be represented by the expression, $$s + \frac{R}{r} \frac{\pi x}{\tan \theta}$$

where R is the radius to the extremities of the arms and $r$ is the radius of the neutral surface, all as shown in FIGURE 6.

It is now possible to consider the amplification possible with the mechanism described above. In known manner the wedge angle $\theta$ can be chosen such that $\tan \theta$ is equal to the static coefficient of friction between the surfaces of the wedges and the split ring. If the split ring is made of nylon or polytetrafluoroethylene and the wedges or disc-like member is made of polished steel, the coefficient of friction can be reduced to as low at 0.09. The ratio of the output of the mechanism at the tips of the arms 46 and 48 to the input at the wedges is represented by:

$$\frac{\frac{R \pi x}{r \tan \theta}}{x} = \frac{\frac{R \pi}{r \tan \theta}}{1}$$

Using a very conservative ratio of 3:1 for $R/r$ and substituting in the above with the values for $\pi$ and $\tan \theta$, there is obtained:

$$\frac{\frac{3 \times 3.14}{0.09}}{1} = \frac{104.7}{1}$$

Thus, a motion amplification better than 100:1 is readily obtainable with the form of the invention discussed in connection with FIGURES 1 to 6.

It should be understood that by suitable calibration of the scale 52 with respect to the amplification factor and the stress-strain relationship of the disc-like member 38 it is possible to directly read the tension in the bolt 30 due to the tightening of nut 32. In this manner the pre-loading can be easily and accurately established.

Instead of making the split ring and the radially extending arms in one piece and of the same material, the construction shown in FIGURES 7 and 8 may be used. Here, the arms are constituted by the radially directed extensions 76 and 78 of an open-ended strap 80 of resilient material. The strap 80 is mounted around the periphery of a split ring 82 which may be identical with the ring of FIGURE 4 except for the elimination of the integral arms 46 and 48. Although not shown in FIGURES 7 and 8, it is to be understood that an indicator card can be associated with the extensions or arms 76 and 78 similar to card 50 in FIGURE 4. Due to the slippage permitted between the strap 80 and the ring 82, the base radius $r$ should be measured to the neutral surface of the strap rather than to that of the ring. If the strap is thin, $r$ may be measured to the inner surface thereof without introducing appreciable error.

A further modification of the split ring is shown in FIGURES 9 and 10, wherein the open-ended strap 80 may be similar to that shown in FIGURES 7 and 8, but the portion which was the ring 82 is replaced by the spaced segments 84, 86 and 88. These segments can be secured to the strap 80 in any suitable fashion and may vary in number so long as there are at least two, with three being preferred. For best operation they should be equally spaced about the strap. It will be appreciated that the segments 84, 86 and 88 together with the strap 80 provide a split ring with an effective wedge-shaped cross section. The construction in FIGURES 9 and 10 will function in the same manner as the embodiments shown in FIGURES 1 to 4 and 7 and 8. Here again the base radius, $r$, is measured to the neutral surface of the strap 80, or to its inner surface if the strap is thin.

Figure 12:
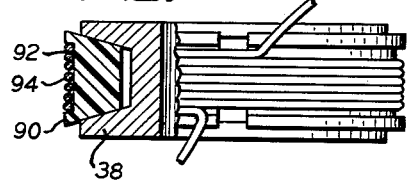
FIGURE 12 is an elevational view partly in section of the structure shown in FIGURE 11 with the section taken on the line 12—12 therein.

So far only mechanical means have been considered for translating a physical quantity, that is, the opening and closing of the gap due to the split in the ring, to a remote point. In particular there has been discussed the use of elongated arms cooperating with an indicator card. However, electro-mechanical means can be associated with or substituted for the elongated arms. Although not shown, it should be readily apparent that electrical contacts can be associated with the ends of the arms in order to actuate electrical relays or the like upon the arms assuming a predetermined spaced relationship. As a direct substitution, however, the structure shown in FIGURES 11 and 12 may be considered typical.

Referring to these figures, the disc-like member 38 may remain the same as previously described, but now the split ring 90 is provided about its periphery with a channel 92. Wound about the ring 90 in the channel 92 is a number of turns of strain sensitive resistance wire 94. This wire has the characteristic of changing its resistance as a function of the tension applied thereto, i.e., as a function of the strain therein. Thus, as the member 38 is compressed causing the ring 90 to expand, it will strain the wire 94 changing its resistance. By incorporating the wire 94 in a suitable electrical circuit, its change in resistance can be caused, in known manner, to control the operation of an indicator or control circuit.

Figure 13:
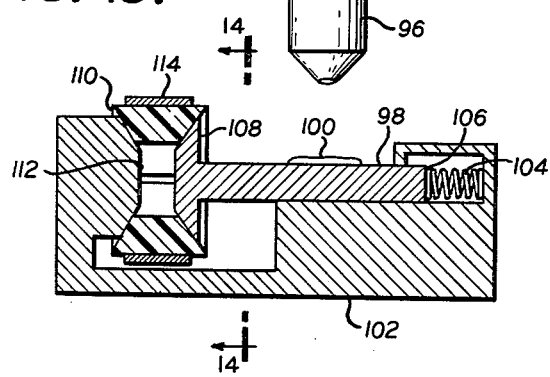
FIGURE 13 is a longitudinal sectional elevation of a micro-manipulator embodying the principles of the present invention.
Figure 14:
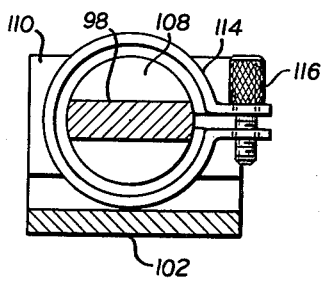
FIGURE 14 is a sectional view on line 14—14 of FIGURE 13.

Up to this point, the motion translator has been considered as a device for amplifying the movement imparted to its input. In the case of a micro-manipulator, however, motion reduction is required. The application of the invention to this type of device is shown in FIGURES 13 and 14 to which attention should now be directed.

A microscope is represented diagrammatically at 96 under which is positioned a specimen slide or support 98. The speciment is represented at 100. The slide 98 is mounted for horizontal movement on the base 102 and is urged by the spring 104 bearing against its end 106 toward the left as viewed in FIGURE 13. The end of the slide 98 opposite end 106 is provided with a wedge-shaped head 108 which mates with the split ring 110. The split ring may be similar to the ring 82 in FIGURE 7. Mating with the opposite surface of ring 110 is another wedge-shaped head portion 112 which is supported in fixed position by the base 102. Thus, any change in diameter of the split ring 110 will cause lateral movement of the slide 98. In order to alter the diameter of the split ring, it is surrounded about its periphery by an adjustable strap clamp 114. A knurled head screw 116 is shown in FIGURE 14 for manually adjusting the opening and closing of the clamp 114. Although only a basic form has been illustrated for purpose of exposition, it should be understood that the clamp 114 may be adjusted by micrometer type means or, in fact, by automatic regulating means in well known manner.

The motion reducer described above may also be used in the construction of a microtome for making microthin slices of specimens for use in microscopic studies. Other applications of the invention should be readily apparent.

Figure 15:
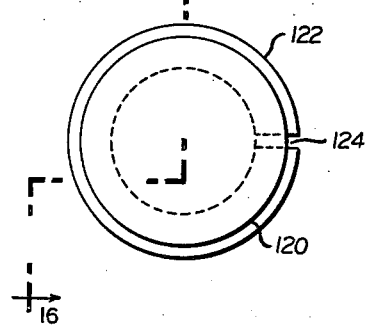
FIGURE 15 is a plan view showing a modification of the split ring and cooperating wedges embodying the invention.
Figure 16:
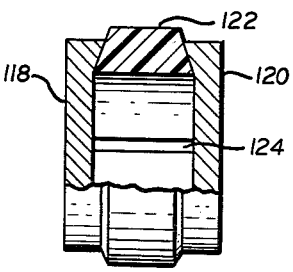
FIGURE 16 is a side elevational view partly in section of the structure shown in FIGURE 15 with the section taken on the line 16—16 therein.

Under certain conditions it may be advantageous to use the configuration shown generally in FIGURES 15 and 16. Here the opposing wedge portions 118 and 120 are provided with conico-concave surfaces rather than conico-convex. At the same time the split ring 122 has a double conico-convex surface for mating with the wedges. With this construction the gap at the split 124 in the ring will increase as the wedges 118 and 120 separate, and will decrease as the wedges converge. It is to be understood that the wedge portions 118 and 120 would, in practice, be associated with the member or portion whose motion is to be sensed or controlled. Likewise the ring 122 would be associated with an indicator, manipulator, or the like.

Figure 17:
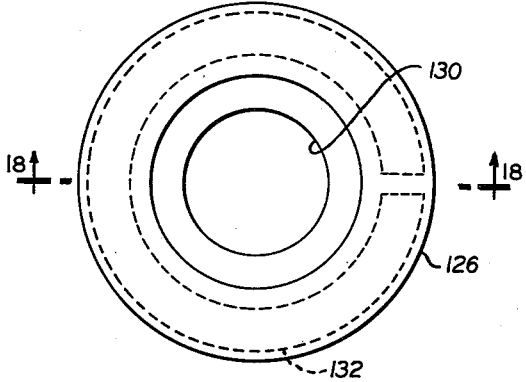
FIGURE 17 is a plan view of a modified complemental wedge construction embodying the invention.
Figure 18:
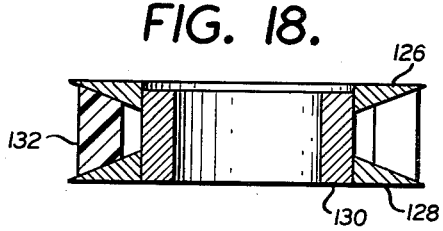
FIGURE 18 is a sectional view on line 18—18 of FIGURE 17.

FIGURES 17 and 18 represent a modification of the bolt load indicator previously described. Here a pair of complementary wedge portions in the form of apertured rings 126 and 128 are mounted in sliding engagement upon the hollow cylindrical member 130 having a given stress-strain characteristic. When the wedge portions and cylindrical member are placed on a bolt under the nut or bolt head, and the assembly is made finger tight, the upper wedge ring 126 will approach the lower ring 128 until its upper surface is flush with the top of the cylindrical member 130. When this condition is achieved, the assembly consisting of elements 126, 128 and 130 will function in substantially the same manner as the member 38 in FIGURE 2. Whereas in FIGURE 2, the member having a given stress-strain characteristic is formed integral with the complementary wedge portions, in FIGURE 18 it is formed separately. The split ring 132 may take the form of that shown in either FIGURES 4, 7, 9 or 12.

It is to be understood that the load indicators described in conjunction with FIGURES 1 to 12, 17 and 18 can be used to indicate the loading between any two parallel plane surfaces and are not limited for use as a bolt load indicator. Where an aperture is not needed through the member determining the positions of the complementary wedge portions such aperture may be eliminated. Thus, in FIGURES 17 and 18, the member 130 may be a solid rather than a hollow cylinder. In fact the member 130 need not have a cylindrical outer surface but may have any configuration so long as the stress-strain characteristic can be determined and the rings 126 and 128 can ride thereupon.

In order to illustrate the versatility of the present invention, attention should now be directed to FIGURES 19 and 20. Here the complementary wedge portions are in the form of rings 134 and 136 provided with means such as the set screws 138 and 140 for securing them in axially spaced relationship upon a rod or other longitudinal member 142 whose loading or straining is to be gauged or controlled. As shown, the split ring 132 is mounted between the wedge rings for operation in a manner which should now be apparent from the preceding description.

The invention has been described with reference to a number of exemplary embodiments thereof, but it is to be understood that it is subject to wide variation and modifications as will be apparent to those skilled in the art to which it appertains.

What I claim is:

1. A motion translator comprising a split ring having an effective wedge-shaped cross section, a wedge having a conically shaped operative surface disposed for axial movement in operative complemental engagement with said ring with the axis of said operative surface coinciding with the axis of the ring such that axial movement of the wedge and opening and closing of the gap due to the split in the ring are mutually dependent with the gap changing at a faster rate than the movement of said wedge, and means for translating a physical quantity between said ring and a remote point, said last mentioned means being coupled with said ring for mutually dependent operation with relation to the opening and closing of said gap.

2. A motion translator comprising a split ring having an effective wedge-shaped cross section, complementary wedge portions embracing said ring, said wedge portions having conically shaped operative surfaces disposed for axial movement in operative engagement with said ring with the axes of said operative surfaces coinciding with the axis of said ring such that opposing axial movement of said wedge portions and opening and closing of the gap due to the split in the ring are mutually dependent with the gap changing at a faster rate than the movement of said wedge portions, and means for translating a physical quantity between said ring and a remote point, said last mentioned means being coupled with said ring for mutually dependent operation with relation to the opening and closing of said gap.

3. A motion translator according to claim 2, wherein the means for translating a physical quantity comprises a pair of elongated arms disposed in the plane of said ring, the arms being joined to said ring one on each side of said gap and extending generally radially therefrom such that opening and closing of said gap by a given amount is accompanied by an amplified movement between the radially outward ends of said arms.

4. A motion translator according to claim 2, wherein the means for translating a physical quantity comprises an electro-mechanical element mechanically coupled to said ring for actuation in repsonse to opening and closing of said gap and arranged to provide a variable electrical output effect.

5. A motion translator according to claim 4, wherein the electro-mechanical element comprises strain sensitive resistance wire wound circumferentially around the periphery of said ring such that its resistance changes with opening and closing of said gap.

6. A motion translator according to claim 2, wherein the means for translating a physical quantity comprises an adjustable strap clamp circumferentially disposed about said ring and adjustable to alter the size of said gap.

7. A strain gauge comprising a split ring having an effective wedge-shaped cross section, complementary wedge portions embracing said ring, said wedge portions having conically shaped operative surfaces disposed in operative engagement with said ring with the axes of said operative surfaces coinciding with the axis of said ring such that opposing axial movement of said wedge portions and opening and closing of the gap due to the split in the ring are mutually dependent with the gap changing at a faster rate than the movement of said wedge portions, said wedge portions being constructed and arranged for axial movement dependent upon the straining of a member to be gauged, and means coupled with said ring operable in mutually dependent relation with respect to the opening and closing of said gap for translating said opening and closing of the gap into an indication of the straining of said member.

8. A strain gauge according to claim 7, wherein said wedge portions are ring shaped for mounting upon a straight longitudinal member whose strain is to be measured, and means are provided for securing said wedge portions in axially spaced relationship upon said member for movement in accordance with the longitudinal elongation or contraction thereof.

9. A load indicator comprising a split ring having an effective wedge-shaped cross section, complementary wedge portions embracing said ring, said wedge portions having conically shaped operative surfaces disposed in operative engagement with said ring with the axes of said operative surfaces coinciding with the axis of said ring such that opposing axial movement of said wedge portions and opening and closing of the gap due to the split in the ring are mutually dependent with the gap changing at a faster rate than the movement of said wedge portions, a member having a given stress-strain characteristic arranged to be subjected to the load to be measured, said wedge portions being constructed and arranged for axial movement dependent upon the straining of said member, and means coupled with said ring operable in mutually dependent relation with respect to the opening and closing of said gap for translating said opening and closing of the gap into an indication of the load applied to said member.

10. A load indicator according to claim 9, wherein said wedge portions are formed integral with said member.

11. A load indicator according to claim 9, wherein said member is cylindrical and disposed concentric with said wedge portions.

12. A load indicator for indicating the loading between parallel plane surfaces comprising a disc-like load sensing member having a given stress-strain characteristic for disposition between said parallel surfaces for compression therebetween, said disc-like member having a V-shaped peripheral groove therein, a split ring having an effective wedge-shaped cross section complemental to said V-shaped groove and disposed in said groove around said disc-like member, the arrangement being such that axial compression of said disc-like member results in opening of the gap due to the split in the ring with the gap opening at a faster rate than said disc-like member is axially compressed, and means coupled with said ring operable in mutually dependent relation with respect to the opening and closing of said gap for translating said opening and closing of the gap into an indication of the load applied to said disc-like member and therefore of the loading between said parallel plane surfaces.

13. A load indicator according to claim 12, wherein the means coupled with said ring comprises an open-ended strap of resilient material substantially encircling said split ring and terminating at its open ends in a pair of radially directed arms, said strap following the movement of said split ring by spreading its arms in response to opening of said gap, and an indicator card arranged to be fixedly positioned relative to the free end of one of said arms and having indicia thereon which is scanned by the free end of the other of said arms to provide said indication.

14. A load indicator according to claim 12, wherein the means coupled with said ring comprises an electro-mechanical element mechanically coupled to said split ring for actuation in response to opening and closing of said gap and arranged to provide a variable electrical output effect for said indication.

15. A load indicator according to claim 14, wherein the electro-mechanical element comprises strain sensitive resistance wire wound circumferentially around the periphery of said ring such that its resistance changes with opening and closing of said gap to provide said indication.

16. A load indicator according to claim 12, wherein said disc-like member has a central aperture for mounting the member about the shank of a bolt thereby to indicate the loading of said bolt.

17. A motion translator comprising a split ring, a member coaxially disposed with respect to the ring for axial movement relative thereto, said member engaging the ring with engaging surfaces of the ring and member being shaped to develop a wedging action therebetween such that axial movement of the member and opening and closing of the gap due to the split in the ring are mutually dependent with the gap changing at a faster rate than the movement of said member, and means for translating a physical quantity between said ring and a remote point, said last mentioned means being coupled with said ring for mutually dependent operation with relation to the opening and closing of said gap.

References Cited in the file of this patent

UNITED STATES PATENTS

| 2,464,152 | Ralston | Mar. 8, 1949 |
| 2,493,029 | Ramberg | Jan. 3, 1950 |

FOREIGN PATENTS

| 862,376 | Germany | Jan. 12, 1953 |